No. 876,752. PATENTED JAN. 14, 1908.
W. E. WALDRON.
AUTOMATIC PAWL OPERATING MECHANISM.
APPLICATION FILED MAY 18, 1907.

WITNESSES

INVENTOR
William E. Waldron
BY
ATTORNEYS

UNITED STATES PATENT OFFICE.

WILLIAM EDWARD WALDRON, OF NEW CASTLE, PENNSYLVANIA.

AUTOMATIC PAWL-OPERATING MECHANISM.

No. 876,752.  Specification of Letters Patent.  Patented Jan. 14, 1908.

Application filed May 18, 1907. Serial No. 374,473.

*To all whom it may concern:*

Be it known that I, WILLIAM EDWARD WALDRON, a citizen of the United States, and a resident of New Castle, in the county of Lawrence and State of Pennsylvania, have invented a new and Improved Automatic Pawl-Operating Mechanism, of which the following is a full, clear, and exact description.

The object of the invention is to provide a new and improved pawl operating mechanism, designed for use on pawl and ratchet devices employed for traveling cranes and other machinery and devices, and arranged to hold the pawl out of engagement with the ratchet wheel when the latter turns forward, and to immediately swing the pawl into locking engagement with the ratchet wheel whenever the latter tends to turn in the reverse direction, thus holding the ratchet wheel against return movement.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1:
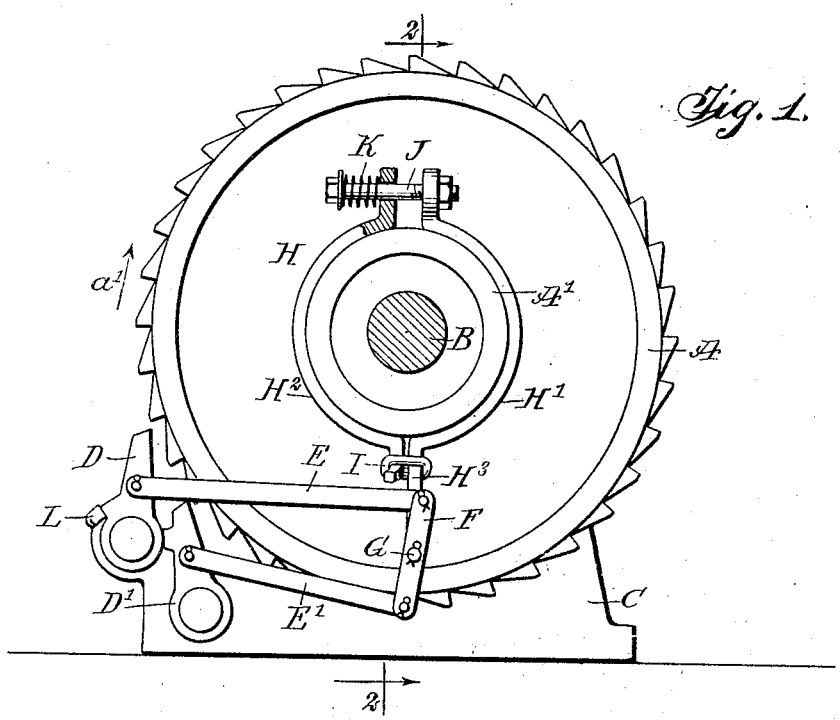
Figure 2:
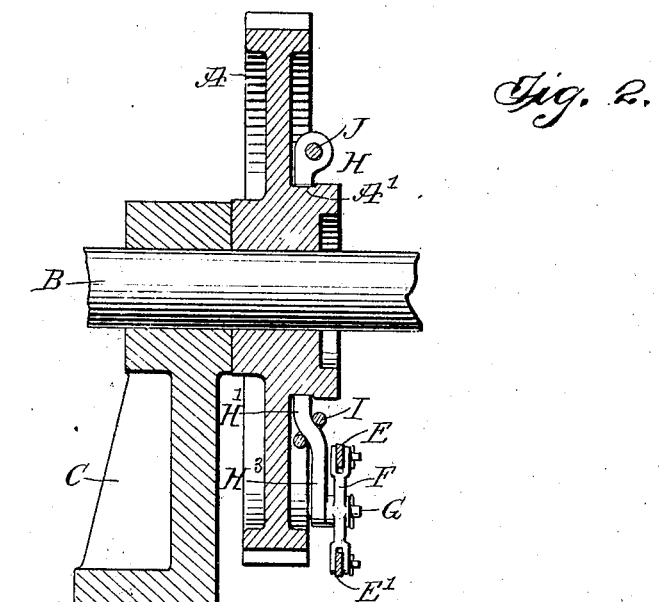

Figure 1 is a face view of the improvement, parts being in section, and Fig. 2 is a transverse section of the same on the line 2—2 of Fig. 1.

The ratchet wheel A is secured to the shaft B rotating forwardly in the direction of the arrow $a'$, and the said shaft B is journaled in suitable bearings C on which are fulcrumed the pawls D and D' adapted to engage the teeth of the ratchet wheel A. The pawls D and D' are pivotally connected by links E and E' with an equalizing lever F mounted to turn on a pivot G held on a friction device H engaging the hub A' of the ratchet wheel A.

The friction device H consists preferably of the friction bands H', H² connected with each other at one end by a link I and at the other end by a pin J and spring K, to hold the friction bands in firm contact with the hub A'. The friction band H' is extended beyond the link I as at H³, and this extension carries the pivot G previously referred to. Now when the ratchet wheel A turns in the direction of the arrow $a'$ then the friction device H tends to turn with it, and in doing so the pivot pin G is carried forwardly so that the equalizing lever F and the links E, E' swing the pawls D, D' outward out of engagement with the ratchet wheel A.

The outward swinging movement of the pawl D is limited by a suitable stop L held on the bearing C, and the outward swinging movement of the pawl D' is limited by the other pawl D. Now when the rotary motion of the ratchet wheel A in the direction of the arrow $a'$ ceases, and the wheel A tends to turn in the opposite direction, then the friction device H in turning with the ratchet wheel A causes the pivot G to travel rearwardly, whereby the equalizing lever F and the links E, E' pull on the pawls D, D', thus moving the same into engagement with the ratchet wheel A, to hold the latter against return movement.

Although I have shown and described the improvement in connection with two pawls D, D', it is evident that the said device may be used for operating a single pawl by making a direct connection between the pawl D and the pin G by the link E. It will also be seen that more than two pawls may be used, and in this case special equalizing levers are employed and connected with the equalizing lever F.

The device is very simple and durable in construction, composed of comparatively few parts, not liable to easily get out of order.

Having thus described my invention, I claim as new and desire to secure by Letters Patent:

1. The combination with the ratchet wheel, of a friction device in connection therewith, said device comprising friction bands having a yielding connection at one end and a link connection at the other end, one of said bands being extended at the link connection, an equalizing lever pivoted by its center to the extended portion, pawls normally engaging the ratchet wheel, and links connecting the ends of the equalizing lever with the respective pawls, whereby when the ratchet wheel is rotated in a reverse direction, the pawls will be moved out of contact with the wheel.

2. The combination with a ratchet wheel, of pawls normally engaging the wheel, a friction device in connection with the hub of the ratchet wheel, an equalizing lever pivoted by its center to the friction device, links connecting the ends of the lever with the respective pawls whereby when the ratchet wheel is rotated in a reverse direction, the pawls will be moved out of contact therewith.

In testimony whereof I have signed my name to this specification in the presence of two subscribing witnesses.

WILLIAM EDWARD WALDRON.

Witnesses:
W. L. WIER,
H. A. WILKINSON.